United States Patent [19]

Hawlitzki

[11] Patent Number: 4,499,528
[45] Date of Patent: Feb. 12, 1985

[54] INTERIOR LIGHT ASSEMBLY FOR A VEHICLE

[75] Inventor: Christian Hawlitzki, Pulheim, Fed. Rep. of Germany

[73] Assignee: Ford Motor Company, Dearborn, Mich.

[21] Appl. No.: 533,482

[22] Filed: Sep. 19, 1983

[30] Foreign Application Priority Data

Dec. 22, 1982 [DE] Fed. Rep. of Germany ....... 3247449

[51] Int. Cl.$^3$ .............................................. F21V 3/00
[52] U.S. Cl. ..................................... 362/275; 362/61; 362/74; 362/245; 362/246; 362/250; 362/311; 362/327; 362/367; 362/368; 362/372
[58] Field of Search ....................... 362/61, 64, 66, 74, 362/33, 232, 234, 238, 239, 240, 241, 244, 245, 246, 250, 263, 269, 275, 311, 319, 327, 367, 368, 372

[56] References Cited

U.S. PATENT DOCUMENTS

| 2,999,150 | 9/1961 | Kallel | 362/74 |
| 4,142,227 | 2/1979 | Aikens | 362/74 |
| 4,298,912 | 11/1981 | Dearth | 362/74 |

FOREIGN PATENT DOCUMENTS

| 1967071 | of 0000 | Fed. Rep. of Germany. | |
| 8110505 | of 0000 | Fed. Rep. of Germany. | |
| 1132016 | 10/1960 | Fed. Rep. of Germany | 362/74 |
| 2209285 | 2/1972 | Fed. Rep. of Germany | 362/74 |

Primary Examiner—Donald P. Walsh
Attorney, Agent, or Firm—Paul K. Godwin, Jr.; Robert D. Sanborn

[57] ABSTRACT

A combination interior illumination and reading light assembly for a vehicle. The assembly comprises a lamp housing 1, a lamp 5 disposed within the housing, a reflector 3 associated with the lamp 5 and a diffuser lens screen 7 for providing diffuse illumination to the vehicle interior. A movable lens element 10 is associated with the reflector 3 and has a focusing lens 9 which serves to provide a directed reading light beam. The lens element 10 also transmits light through its sidewalls to illuminate the diffuser lens screen 7. The lens element 10 is received in a ball-type socket defined by a circular aperture in the diffuser screen 7 and is rotatable relative to the screen 7 in the manner of a captive ball to enable the direction of the reading light beam to be varied at will.

5 Claims, 3 Drawing Figures

INTERIOR LIGHT ASSEMBLY FOR A VEHICLE

BACKGROUND OF THE INVENTION

1. Field of the Invention

The invention relates to the field of interior illumination and reading light assemblies, in particular for a vehicle.

2. Description of the Prior Art

A combination interior illumination and reading light device is disclosed in the German Utility Model No. 19 67 071. In that disclosure, an electric lamp is shown as being associated with an adjustable housing in which a diffuser or a focusing lens is selectably movable between the lamp and an apertured framework to select either dispersed illumination or a focused reading light beam.

German Utility Model No. 81 10 505 discloses another type of combination interior illumination and reading light device in which an electric lamp, mounted in a reflective housing, is partially surrounded by a rotatable shield with a defined opening. Rotation of the shield provides, through its opening, either dispersed light directly through a lens or a focused beam if reflected from the housing prior to being directed through the lens.

Both of the known combination interior illumination and reading light devices provide, in the space dedicated for a normal interior light, a single electrical lamp, that provides not only illumination of the vehicle interior under the control of a door operated switch, but also the use at will of a reading light for the driver or the front-seat passenger.

However, both of those known interior and reading light devices have the drawback that the reading light beam is aimed in a relatively fixed direction.

Since the autumn of 1981, an interior and reading light arrangement has been provided in the roof panel of the European version of a Ford Granada GL. In that arrangement, two reading lights formed with respective lenses and lamps are individually adjustable about a ball-joint and are disposed adjacent a separate interior light with its own diffuser screen.

Although in the case of the Ford arrangement the reading light beam may be aimed to all directions, the space required, along with the production and mounting costs are comparatively large as a result of the three separate electric lamps required and the separate housings required.

SUMMARY OF THE INVENTION

According to the present invention, a combination interior illumination and reading light assembly is provided for a vehicle, comprising a lamp housing, a lamp arranged within the housing, a reflector element associated with the lamp and a diffuser lens portion connected to the lamp housing for providing diffused illumination to the vehicle interior. A separate condensing lens is associated with the reflector element and serves to provide a directional reading light beam. The condensing lens is mounted in a socket defined by a circular aperture in the diffuser lens and is rotatable with the reflector element relative to the diffuser lens in the manner of a captive ball to enable the direction of the reading light beam to be varied at will. The mounting portion of the condensing lens is transparent and allows a portion of the light radiated by the lamp to be transmitted to the diffuser lens portion and be dispersed to the interior of the vehicle.

By providing a captive ball type mounting of a separate condensing lens in the diffuser portion of the lamp housing, both an interior lighting device and a fully adjustable reading light for the driver or the front-seat passenger utilize the same lamp and enable unit to be fitted into a small space with low production and assembly costs.

The reflector is part spherical and is secured for rotation, with the condensing lens, relative to the lamp housing. A cup-shaped condensing lens with transparent spherical shaped sidewalls is connected to the reflector and the reflector/lens combination is supported in the manner of a captive ball between the rear of the housing and the diffuser portion. It is then possible to obtain a high degree of flexibility in adjusting the orientation of the reading light beam.

In the present invention, the optical design of the spherical sidewalled portion of the condensing lens is such that the illumination falling on the rear side of the diffuser lens is quite even.

BRIEF DESCRIPTION OF THE DRAWINGS

The preferred embodiment of the invention is described in detail by way of example, with reference to the drawings, in which.

DETAILED DESCRIPTION OF THE PREFERRED EMBODIMENT

Figure 1:
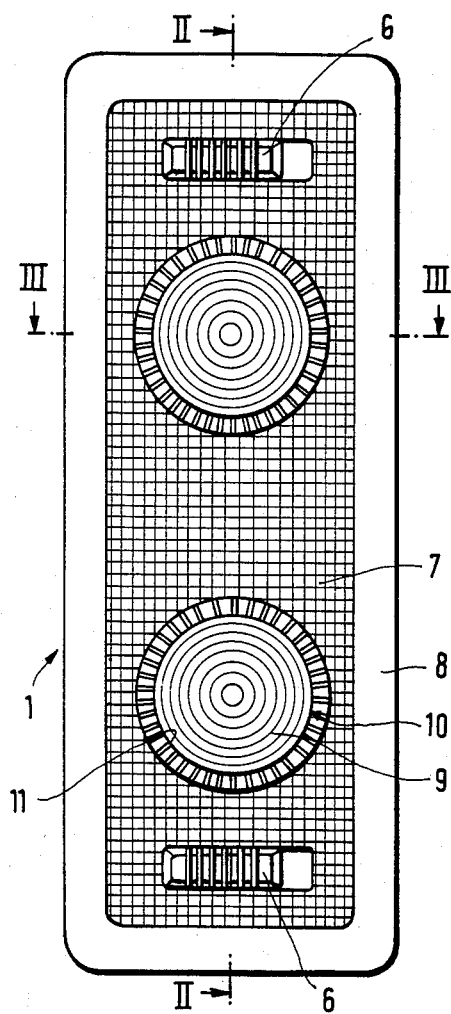
FIG. 1 is a plan view of a preferred embodiment as a combination interior illumination and reading light assembly of the present invention.
Figure 2:
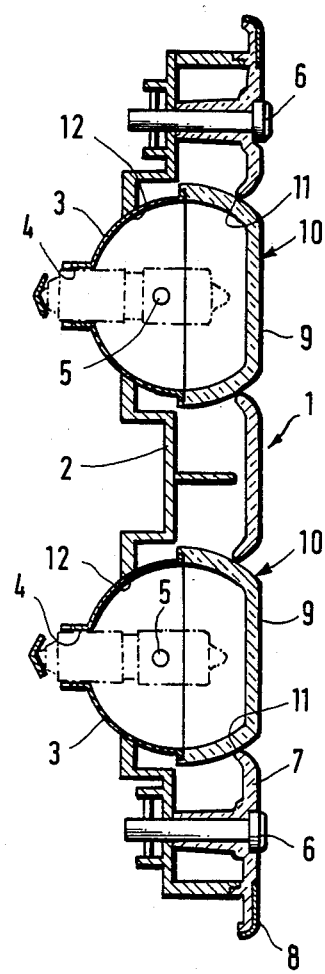
FIG. 2 is a sectional view taken along the line II—II of FIG. 1.
Figure 3:
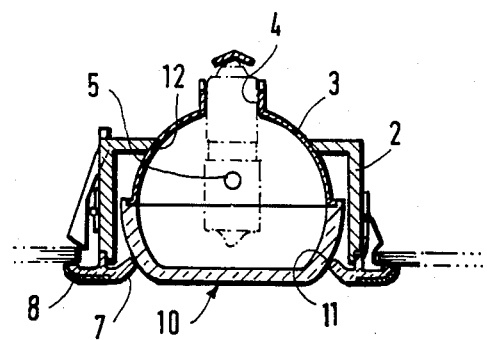
FIG. 3 is a sectional view taken along the line III—III of FIG. 1.

The figures show a combination interior illumination and reading light assembly 1. The FIGS. 1 and 2 illustrate dual reading lamps in a single housing 2, wherein each reading lamp unit contains identical parts. Hereinafter, reference will be to a single part in a single unit.

The assembly 1 comprises a lamp housing 2 providing structural support, a partially spherical reflector 3 disposed therein and an electric bulb 5 held in a corresponding socket 4 formed in the reflector 3. The bulb may be switched on and off at will by a corresponding switch 6 or a door activated switch (not shown) to provide visible radiation. The housing 2 is enclosed at the front by a correspondingly formed diffuser lens screen 7 having a peripheral edge with an opaque layer 8 molded thereon.

The lamp 5 mounted in the socket 4 in the spherical reflector 3 is correspondingly associated with a cup-shaped lens element 10 comprising a focusing lens 9. In this case, the focusing lens 9 is formed as a flat surfaced Fresnel type lens. The lens element 10 is formed of the same material as the diffuser lens screen 7 and passes through a circular aperture 11 formed in the diffuser screen 7. The focusing lens 9 lies generally flush with the surface plane of the diffuser screen 7 but is angularly rotatable with respect thereto. The sidewalls of the lens element 10 are formed so as to pass light incident thereon and also provide illumination to the rear of the diffuser screen 7. This provides the diffused interior illumination to the vehicle.

In this embodiment of the present invention, as illustrated, the spherical reflector 2 provides reflection of a portion of the bulb radiation in the direction of, and is connected to, the cup-shaped light lens element 10, for example by a clip-on connection at the periphery of those elements. The reflector 3 is supported for movement in a circular aperture 12 in the lamp housing 2, and the lens 10 is supported for corresponding movement in the circular aperture 11 in the diffuser screen 7. In this way, the lens 10 may be angularly rotated in the manner of a ball-joint together with its associated hollow reflector 3 and bulb 5, if finger pressure is applied to the planar surface of the focusing lens 9.

In an alternative embodiment (not shown) of the invention the reflector 3 may be formed to be fixed in the lamp housing and the cup-shaped lens element 10 may be formed so as to rotate about the inner or outer surfaces of the reflector in a ball-joint adjustment of the lens 10 in its circular aperture in the diffuser screen 7.

If two focusing lenses 10 are disposed in the diffuser screen 7, as is shown in FIGS. 1 and 2, very good interior lighting is obtained by simultaneously switching on both the electric lamps of the separate reading lights. Uniform lighting of the entire diffuser screen 7 is ensured by appropriate optical design of the sidewalls of the lenses 10, lying within the lamp housing.

What is claimed is:

1. A combination interior illumination and reading lamp assembly for a vehicle enclosure comprising:
    means providing a structural support housing for the assembly;
    lamp means for providing visible radiation;
    means surrounding a portion of said lamp means for reflecting a portion of said visible radiation in a predetermined direction;
    means surrounding second portion of said lamp means and being connected to said reflector means for directing said visible radiation in a plurality of predetermined directions; and
    means defining a diffusing lens element mounted on said housing means and surrounding said directing means;
    wherein said directing means comprises a focusing lens positioned opposite said reflector means for directing a portion of said visible radiation in a beam away from said housing and a transmittance portion for allowing the remaining of said radiation to be transmitted towards said diffusing lens means and said directing means is movable, within said assembly to allow free selection of the direction of said beam.

2. An assembly as in claim 1, wherein said housing defines an aperture for retaining and supporting said reflecting means;
    said diffusing lens means defines an aperture for retaining and supporting said directing means, whereby said reflecting means is movable with said directing means.

3. An assembly as in claim 2, wherein said reflecting means, said lamp means, and said directing means are movable together within said housing.

4. An assembly as in claim 2, wherein said directing means is generally cup-shaped having partially spherical sidewalls extending from a substantially flat focusing lens portion and said sidewalls are movable along the aperture defined in said diffusion lens to provide rotational movement with respect thereto.

5. An assembly as in claim 4, wherein said partially spherical sidewalls of said directing means are transparent to form said transmittance portion.

* * * * *